March 25, 1969     B. E. JOHNSON ET AL     3,434,911

DECORATIVE ARTICLE AND METHOD OF MAKING SAME

Filed May 13, 1965

INVENTORS
BETH E. JOHNSON
BERNICE E. STUART
BY
ATTORNEYS

United States Patent Office 3,434,911
Patented Mar. 25, 1969

3,434,911
DECORATIVE ARTICLE AND METHOD
OF MAKING SAME
Beth E. Johnson, 4377 South 615 East, Salt Lake City,
Utah 84107, and Bernice E. Stuart, 812 Brookshire
Drive, Kaysville, Utah 84037
Filed May 13, 1965, Ser. No. 455,533
Int. Cl. B32b 27/36; B44f 11/00
U.S. Cl. 161—16                                5 Claims

ABSTRACT OF THE DISCLOSURE

Placing a mixture of polymerizable and gelable thermosetting resin in a mold, allowing it to set up to a soft-gel stage wherein liquid and solid polymers simultaneously exist, and while it is in the soft-gel stage stirring the interior thereof without disturbing a layer adjacent to the mold. The articles produced has a smooth outer surface, but fracturing and filling of the fractures inside creates an optical diffraction that is pleasing to the eye.

Figure 1:
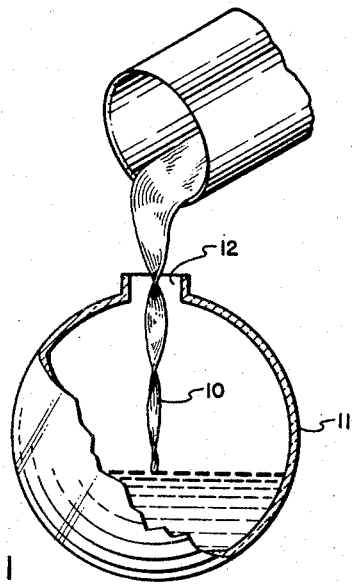

This invention relates to decorative articles of manufacture such as are commonly used in clusters by interior decorators and as a means of attracting attention to store displays. They are also used singly, or in sets, as knobs for doors, drawers, vehicle shifting levers, and the like.

It has long been common to form such decorative articles by pouring colored or clear casting resin into a mold, allowing it to set, and then removing the mold to obtain a transparent solid article.

The principal object of the present invention is to provide an article having substantially the same transparent outer configuration as those previously made, but with an interior that is distorted to have a generally translucent, filled fracture-like like appearance, not heretofore obtained.

In accomplishing the foregoing object we preferably utilize a transparent mold and pour the resin therein. During the soft-gel stage when both solid and liquid polymers exist in the resin as it sets up in the mold we gently stir the inside material in such a manner that the outside layer of material adjacent the mold is not disturbed. The end of the stirrer in the resin is moved in a circular motion while at the point of its insertion into the resin there is little movement of the stirrer. The stirring fractures the solid polymers, and the liquid polymer moves into the fractures where it hardens, the fracture planes formed then serving as light diffusers.

The outstanding feature of the article produced in accordance with the method of the invention is its smooth transparent exterior surface surrounding a translucent interior that has a generally filled fracture-like appearance resulting from an optical diffraction.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

Figure 2:
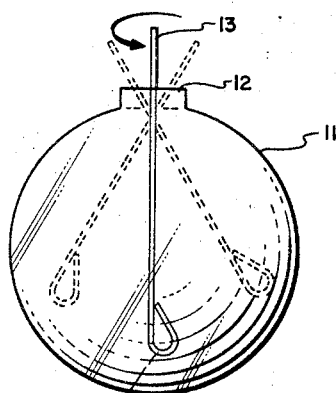
Figure 3:
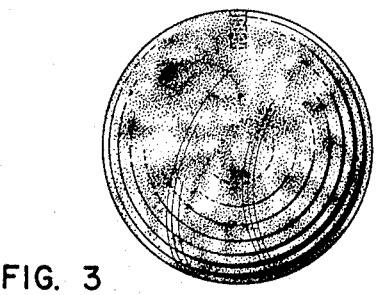

In the drawing:

FIG. 1, a schematic side elevation showing resin being poured into a mold;

FIG. 2, a side elevation of the mold after it has been filled with resin, and showing the operation of the stirrer; and FIG. 3, a side elevation of the finished article of the invention.

Referring now to the drawing:

In the illustrated preferred form the decorative article is formed by pouring a thermosetting polymeric casting resin, shown at 10 into a mold 11 having an opening therefor at 12. It has been found that a clear orthophthalic polyester resin to which the usual catalyst, for example, methyl ethyl ketone peroxide is added in accordance with the manufacturer's instructions very satisfactory for the purpose. If it is desired to produce colored decorative articles a dye of the desired color can be added to the resin before it is mixed and poured into the mold. In one production run, for example, a rigid, unsaturated polyester resin (YC–5158 manufactured by the Pittsburgh Paint Company, Pittsburgh, Pa.) was used. In accordance with the manufacturer's published instructions for use at ambient temperatures (72° F.) the resin and its catalyst (ethyl ketone peroxide) were mixed three-fourths of a minute, in the ratio of about 1% by volume catalyst to 99% by volume liquid resin and the mixture was poured into a mold. The molded mixture, as stated by the manufacturer, began to gel within one minute and reached the soft-gel stage in about three and one-half minutes. The stirrer rod was inserted and the careful stirring of the interior took place for approximately thirty seconds, between three and one-half and four minutes after the resin and catalyst were originally combined. As is well known in the plastics industry, the reaction time of such resins can be changed by changing the percentage of catalyst added or by addition of a promoter such as cobalt octoate. However, the compositions of the resins are not of concern in the present application, except insofar as they must have the properties of setting up solid after passing through the soft-gel state wherein both solid and liquid polymers are simultaneously present in a homogenous mass. As a practical matter, because thermo-plastic resins are too difficult to mold while simultaneously stirring an inner portion thereof, the present application is limited to use with thermosetting resins.

In accordance with the invention, a rod 13 is inserted through opening 12 and the inside of the molded article is stirred while the article is in the soft-gel stage. During this operation care is taken to avoid violent stirring and contact with the layer of resin adjacent the interior mold surface that will damage the smooth outer surface of the completed article. The use of a removable transparent mold allows the stirring to be viewed so that damage to the outer surface of the article can be more easily avoided.

The stirring must be accomplished when the resin has obtained a soft-gel state. Otherwise, the desired filled fracture-like appearance cannot be obtained. If stirring occurs before the soft-gel state is reached only a few bubbles or holes will develop in the interior of the article. This is apparently due to the fact that only a few solid polymers are available to be fractured, and they are so small that the liquid moving into their fractures appears bubbly, or like holes. If the resin is too set-up the stirring rod will stick in the article, possibly causing it to crack. This is apparently due to the simultaneous shrinking of the compound and the expansion of the stirring rod as heat is generated by the compound during the hardening process. Furthermore, an undesirable open, cracked appearance, and not a filled fracture-like appearance is obtained, since there is not sufficient remaining liquid to fill the fractures formed in the solid polymers by the stirring.

As a precaution against the end of the stirrer penetrating the outer surface of the article being formed, the stirrer is preferably formed with a curved end 14. Thus, no sharp edges are available to penetrate the layer of resin adjacent the mold.

The decorative article thus formed has many uses. It has been found highly desirable for use in interior decorating, in groupings as a centerpiece, for example; as drawer pulls for furniture; knobs for cabinets; and even as a gripping handle for the shift levers of automobiles. For such uses, it may be desirable to insert a threaded plug such as is shown in dotted lines in FIG. 3 into the resin, either as it hardens, or by drilling a separate hole therefor and bonding the plug in place after the resin has hardened.

Whereas there is here illustrated and specifically described a certain preferred article and method of manufacture which are presently regarded as comprising the best form of the invention, it should be understood that various changes may be made and other constructions and methods adopted without departing from the inventive subject matter particularly pointed out and claimed herebelow.

We claim:

1. A method of producing a smooth surfaced decorative article having a transparent outer surface and a translucent, disturbed interior which comprises:
    placing a mixture of polymerizable and gelable thermosetting resin in a mold;
    allowing said resin to cure to a soft-gel stage wherein both liquid and solid polymers simultaneously exist;
    stirring the interior portion of said resin while it is in its soft-gel stage to thereby fracture solid polymers, while avoiding disturbance of a layer of the resin adjacent to the interior surface of the mold;
    allowing said resin to solidify; and
    removing the mold from the article formed by the solidifying of the resin.

2. The method of claim 1, wherein a dye is added to the resin and catalyst before they are poured into the mold.

3. The method of claim 1, wherein the polymeric resin is a polyester.

4. The method of claim 1, wherein the mold is transparent.

5. An article of manufacture made by the process of claim 1.

References Cited

UNITED STATES PATENTS

| | | | |
|---|---|---|---|
| 2,353,995 | 7/1944 | Conner | 161—5 |
| 3,240,849 | 3/1966 | Eulgem et al. | 264—108 |
| 3,328,499 | 6/1967 | Barnette | 264—108 |

JACOB H. STEINBERG, *Primary Examiner.*

U.S. Cl. X.R.

264—73, 108, 279, 308, 317